Nov. 24, 1959 R. GOUIRAND 2,914,339
COMBINATION CHASSIS FRAME AND PNEUMATIC
SUSPENSION FOR VEHICLES
Filed July 9, 1956 4 Sheets-Sheet 2
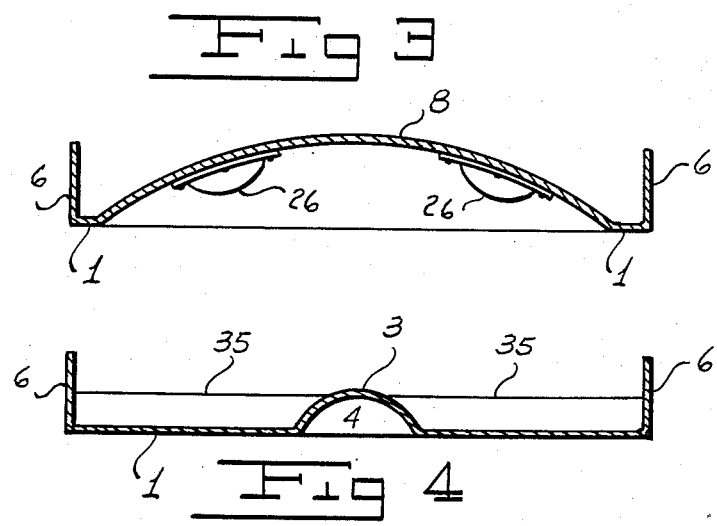
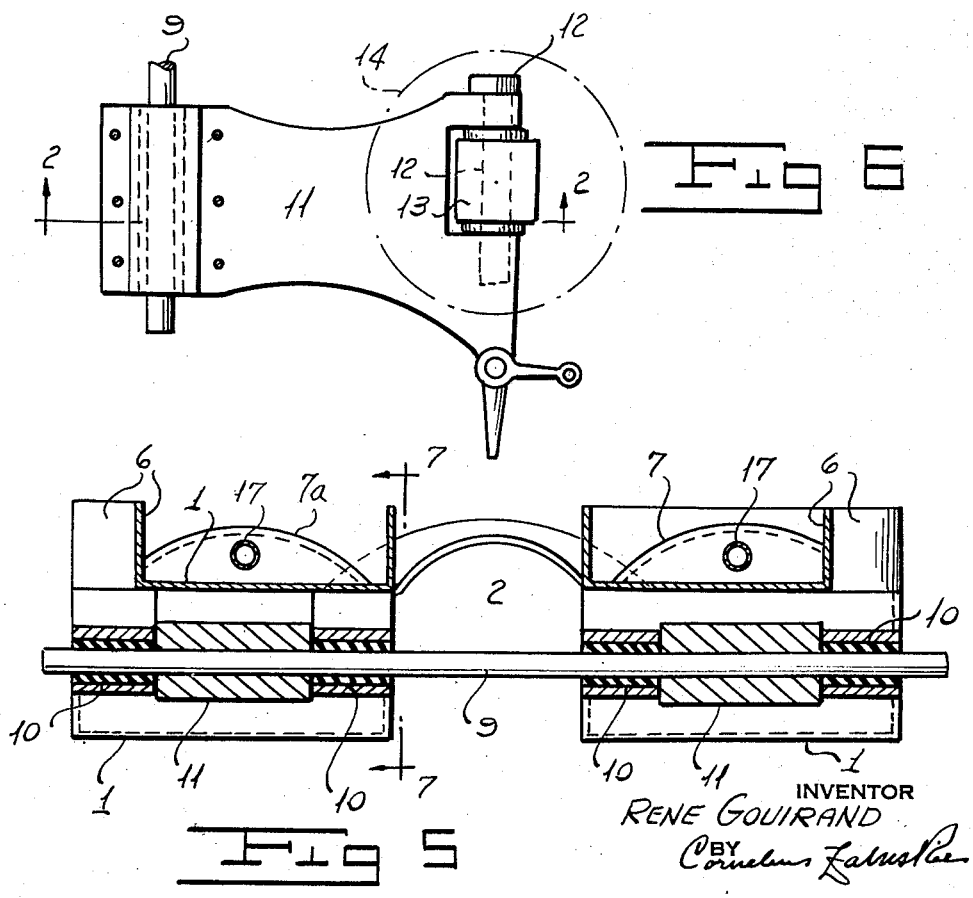
INVENTOR
RENE GOUIRAND
BY
ATTORNEY

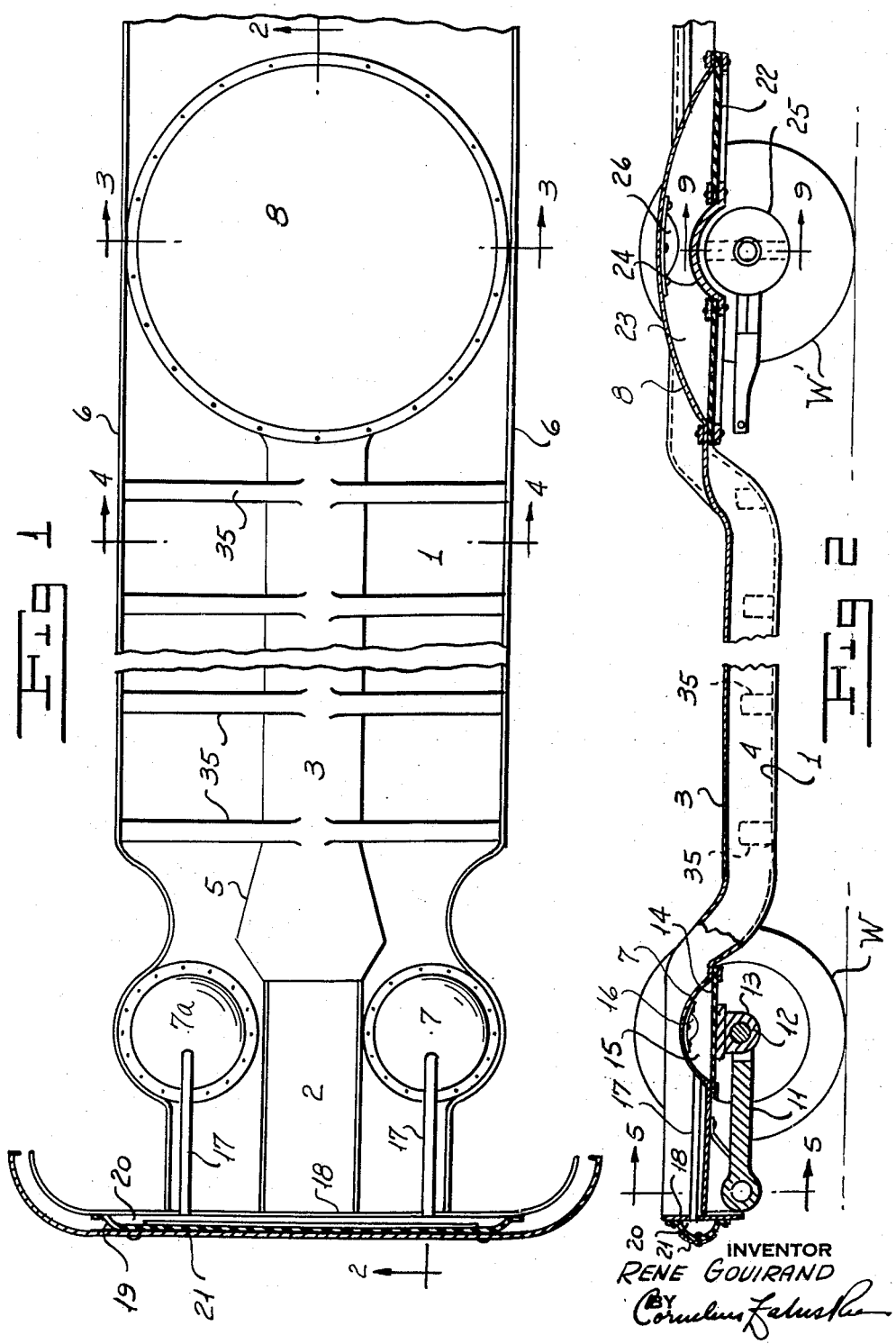

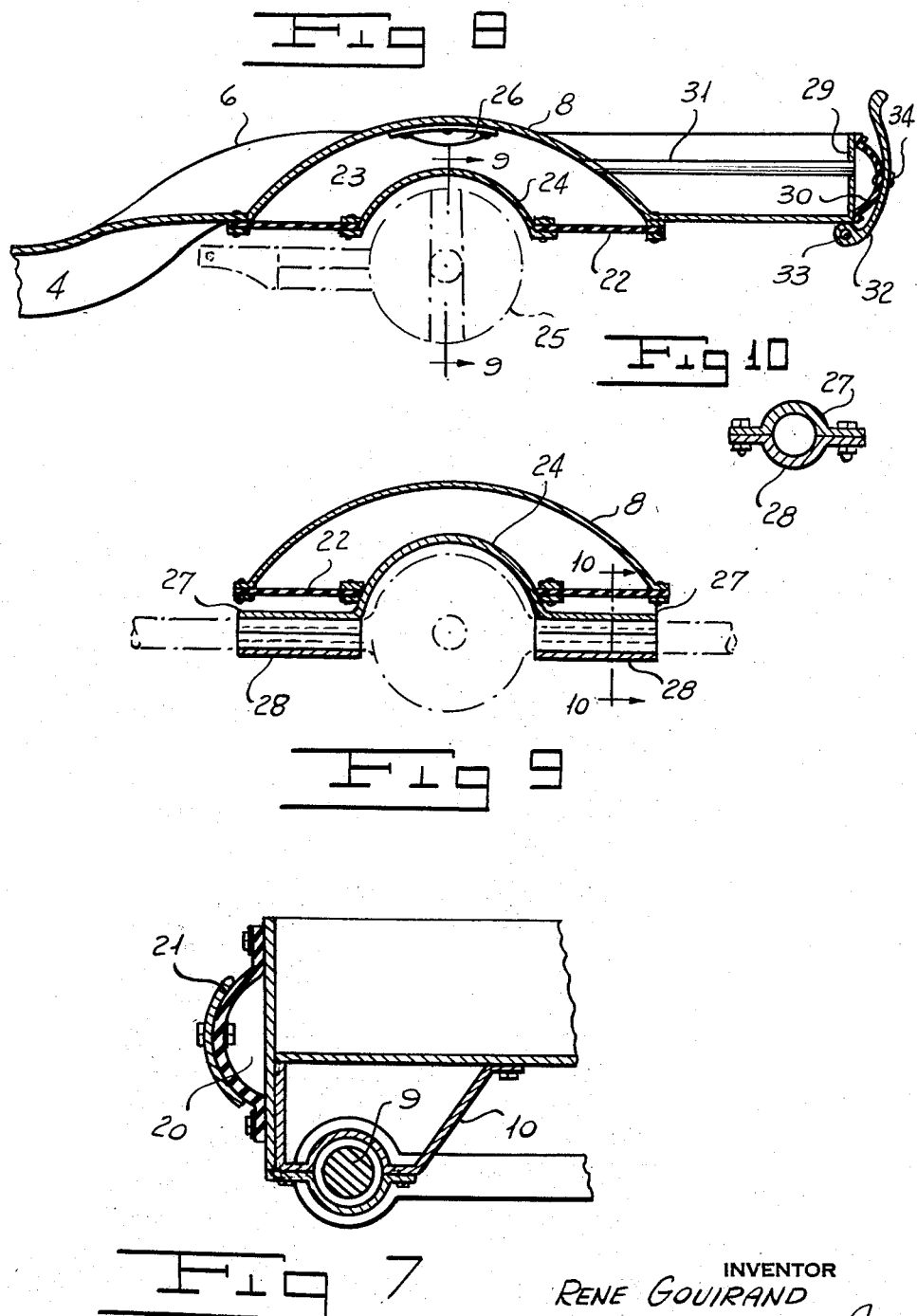

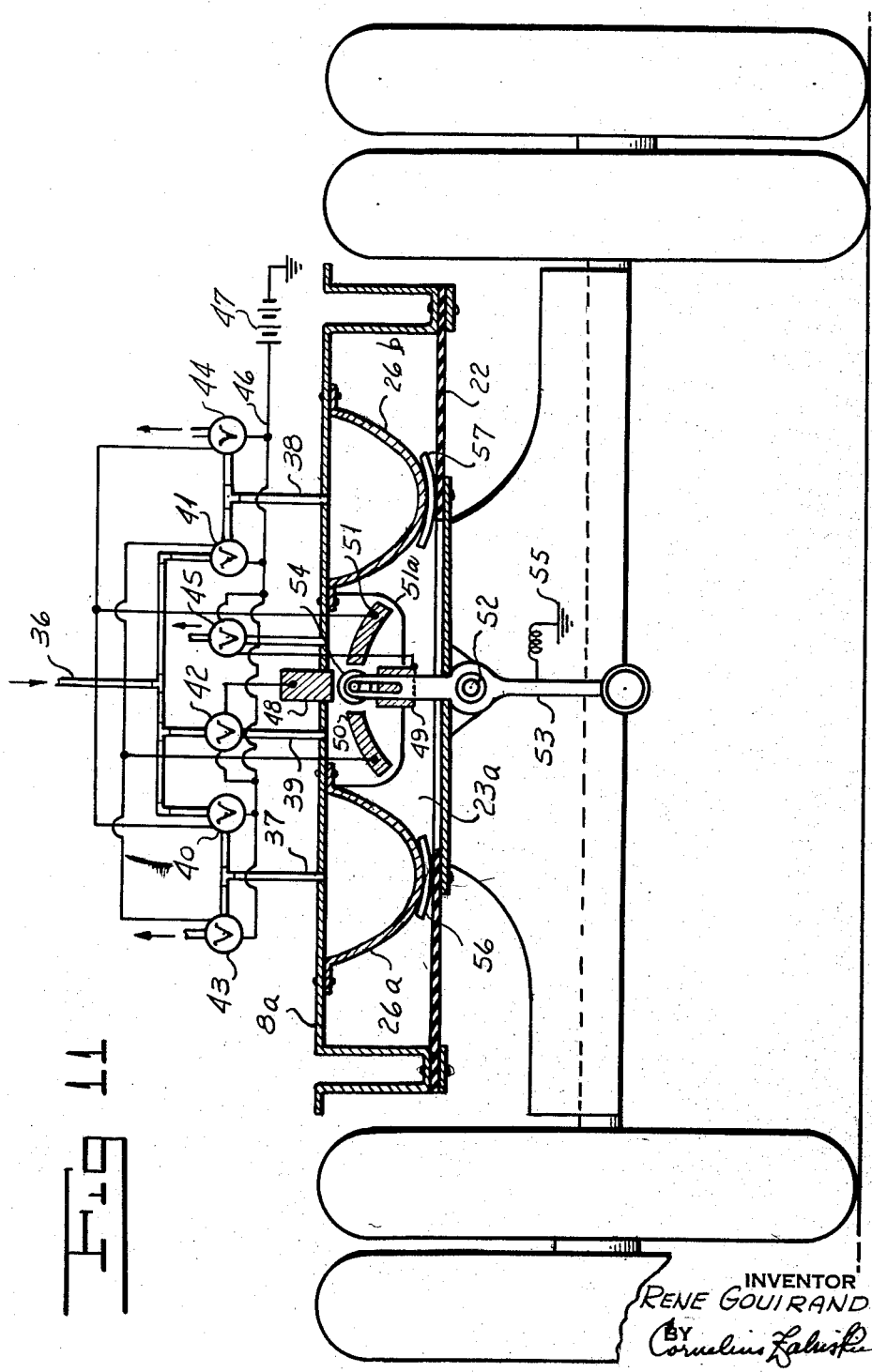

United States Patent Office 2,914,339
Patented Nov. 24, 1959

2,914,339

COMBINATION CHASSIS FRAME AND PNEUMATIC SUSPENSION FOR VEHICLES

Rene Gouirand, New York, N.Y.

Application July 9, 1956, Serial No. 596,689

14 Claims. (Cl. 280—124)

This invention is a combination chassis frame with pneumatic suspension, for motor vehicles. It has been the general practice in constructing a chassis frame for a motor vehicle to fabricate it mainly from structural steel channel sections welded together and on this frame the body is supported. Where a pneumatic suspension is employed, the practice is to fabricate the pneumatic suspension means independently of the chassis and thereafter mount it as a unit upon the chassis frame.

The object of the present invention is to greatly simplify a chassis construction and at the same time incorporate therein essential parts of the pneumatic suspension means by forming the frame and said parts integrally with one another from sheet steel of sufficient gauge to impart the necessary strength to the structure as a whole.

In the forming of chassis frames for relatively small cars, the frame may be formed of a single piece of sheet steel, but where the size of the vehicle would require dies of excessive length, the chassis frame may be stamped in two or more pieces corresponding to different portions of the length of the frame and thereafter welded, riveted or bolted together in joints extending transversely of the frame. The dies employed for stamping the frame from sheet steel are so constituted as to provide the frame with appropriate reinforcing ribs and, where necessary, an appropriate tunnel for the main drive shaft.

Where pneumatic suspensions are to be incorporated, the dies are so constituted as to form appropriate portions of the steel plate into domes, the hollow interiors of which may be employed as compression chambers in which the supporting fluid of the pneumatic suspensions may be housed.

Diaphragms close the open bottoms of these chambers and said diaphragms are connected to the wheel carrying portions of the vehicle, as will be hereinafter more fully explained.

The present invention may be employed either with or without pneumatic suspensions and there may be associated with the vehicle embodying this invention novel pneumatic bumpers, the details of which will be also hereinafter more fully explained.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

Fig. 1 is a plan view of a chassis frame embodying the present invention shown without the body or the power plant adapted to be associated therewith.

Fig. 2 is a section on the line 2—2 of Fig. 1.

Fig. 3 is a transverse section through the chassis frame on the line 3—3 of Fig. 1.

Fig. 4 is a like view on the line 4—4 of Fig. 1.

Fig. 5 is a transverse section on the line 5—5 of Fig. 2.

Fig. 6 is an underneath plan view showing the manner of mounting the front wheel spindles.

Fig. 7 is a section on the line 7—7 of Fig. 5.

Fig. 8 is a central section of the rear end of a chassis frame embodying the present invention with an associated pneumatic rear bumper. In this view the axle housing and associated rear bearing housing are shown in dot and dash lines.

Fig. 9 is a transverse section on the line 9—9 of Fig. 7 and line 9—9 of Fig. 8.

Fig. 10 is a section on the line 10—10 of Fig. 9.

Fig. 11 is a transverse section corresponding generally to Fig. 3, but showing a modified form of construction.

In the manufacture of the chassis frame of this invention, sheet steel is operated upon by appropriate cutting and shaping dies to form the sheet into a frame, such as shown in the drawings. The overall outline is cut to an appropriate configuration and then pressed to form a floor 1 which may be flat throughout, but is preferably depressed intermediate its length as shown in Fig. 2. The central portion of the forward part of the floor is cut away, as shown at 2, to provide space for the lower portion of the engine, while the longitudinal medial portion of said floor is pressed upwardly as at 3 to provide a tunnel 4 through which the main drive shaft may extend from the power plant to the rear axle housing. The forward end of the tunnel may be somewhat enlarged as at 5 to provide additional space for the transmission, universal joint, etc. The lateral edges of the steel sheet are pressed upwardly to provide along both sides of the floor 1 upstanding flanges 6 which preferably extend for the full length of the frame and may also be extended across the front and back of the frame.

If the vehicle is to have a pneumatic suspension, domes 7 and 7a are pressed upwardly in the forward portion of the floor to provide essential parts for a pneumatic knee action suspension associated with the front wheels. Likewise a larger dome 8 is pressed upwardly adjacent the rear end of the floor to form part of the pneumatic suspension for the rear wheels of the vehicle. With the stamping thus constituted, pneumatic suspensions may be very simply incorporated.

For pneumatically suspending the forward portion of a vehicle, with independent suspension for the front wheels, a fulcrum bar 9 extends transversely below the front end of the frame and is supported thereon by brackets 10, welded or riveted to the floor of such frame, as shown best in Figs. 5 and 7. On this fulcrum bar 9 are pivoted two arms 11. Each of these arms 11 extends rearwardly and is secured to a pivot 12. This pivot is carried by a fixture 13 secured to the central portion of a diaphragm 14, the periphery of which is secured to the floor 1 about the margin of one of the domes 7 or 7a to form therewith a hermetic seal to an enclosed space 15 which constitutes a compressed air chamber for the pneumatic suspension of one of the front wheels W. Compressed air is maintained under the desired pressure in the chamber 15 to support one side of the forward end of the chassis from that particular wheel. This arrangement is duplicated at opposite sides of the vehicle, so that the advantages of independent suspension are thereby obtained. I preferably mount a limiting stop 16 in the top of each chamber, so as to take excessive shocks through engagement with the upper surface of the fixture 13 and thus save the corresponding diaphragm from excessive strains.

This construction lends itself to effective use of a pneumatic bumper, such as shown in Fig. 2. A plate 18 extends entirely across the front of the chassis frame and may either be welded in place thereon or constitute a flange upturned from the floor of said frame. To the front of this plate is secured a flexible housing 19, the interior of which forms a chamber 20 to the forward wall of which is secured a bumper 21. The opposite ends of the chamber 20 are connected by pipes 17 to the pneumatic suspension chambers 15 at the opposite sides of the vehicle and the bumper is thus made pneumatic in its nature and is adapted to pneumatically cushion shocks to which the vehicle is subjected. The connection of the two chambers 15 with one another has a distinct advantage in that it permits each one to function as a surge chamber for the other.

The open bottom of the dome 8 at the rear end of the frame is sealed by a diaphragm 22 to form within said dome a compressed air chamber 23. The diaphragm is shown as having an opening in its center, pneumatically sealed by a plate 24 preferably arched so as to clear the rear axle housing 25 associated with the rear axle which carries the spindles for the rear wheels W'. The plate 24 is provided with lateral extensions 27, shown in Fig. 9, which function after the manner of saddles to rest upon the rear axle housing and support the plate 24 thereon. These saddles may be secured to the housing by underneath caps 28 bolted to the saddles 27 as shown in Fig. 10. One or more stops 26 may be mounted within the chamber 23 to take up excessive shocks of rough roads.

As shown in Fig. 8, the frame may be provided with a rear pneumatic bumper. This may be accomplished by providing a plate 29 to extend across the back end of the frame, attaching to the back of said plate a flexible pneumatic housing 30, and connecting the interior of that housing to the interior of the compressed air chamber 23 by a duct 31. A metal bumper 32 may be pivoted at its lower end as at 33 and secured intermediate its height at 34 to the pneumatic housing 30, as clearly shown in this figure.

It will of course be understood that the frame may be reinforced with appropriate longitudinal and transverse flanges. Ordinarily the arch 3 of the tunnel 4, together with the lateral flanges 6, will impart the necessary longitudinal strength, while transverse rigidity may be provided by pressing into the floor 1, transverse ribs 35, shown best in Figs. 1 and 2. Any number of these ribs may be provided and their lateral ends may be welded to the marginal flanges 6.

Where it is economical to do so, it is preferred to die form the entire frame from a single piece of sheet steel of appropriate gauge to provide the desired strength. However, in some instances where the frame must be so long as to require dies of excessive size, it is entirely feasible to stamp different portions of the length of the frame as independent sections with flanges at their free transverse edges, so that said flanges may be subsequently assembled by riveting, welding, or otherwise, to produce a strong rigid structure well able to carry the load and withstand strains of usage.

The chassis frame of the present invention may be used with vehicles of all kinds, either motor propelled or trailers or semi-trailers and passenger or freight carrying vehicles. In any event the chassis frame of this invention lends itself to the convenient mounting of both power plant and the desired body thereon by bolting the same thereto or securing it in any appropriate manner.

In the forms of the invention thus far described, each of the compressed air chambers 7, 7a and 8 are provided interiorly with limiting stops 16 and 26. These stops may be solid and unyielding or resilient and may, if desired, contain air under pressure so that they function with a cushioning action.

In Fig. 11 I have shown a modified form of construction utilizing pneumatic cushioning chambers shown here as associated with the rear axle. The dome portion 8a of this figure which corresponds to the dome 8 is of somewhat different shape, although it may be of the shape shown in Fig. 2. To the under side of the dome is secured two flexible limiting stops 26a and 26b of resilient material constituting pneumatic cushions. A system of tubing is provided, as shown, having an inlet 36 connected to a source of compressed air which may be a tank on a vehicle. Tubing connections lead from said compressed air inlet 36 to tubes 37 and 38 which lead respectively to the two pneumatic cushions 26a and 26b and a third tube 39 leads to the interior of the load carrying compressed air chamber 23a above the diaphragm 22. These tubing connections include compressed air inlet valves 40, 41 and 42, respectively. Additional valves 43, 44 and 45 are provided in the system to respectively exhaust the several chambers to the atmosphere.

The valves 40—45 are preferably normally closed solenoid valves adapted to be opened when the coils of the solenoids of said valves are energized. The coils of these valves are connected in multiple by a wire 46 with one pole of a battery 47, the opposite pole of which is grounded. The other terminal of the coil of each valve is electrically connected to one of a series of switch contacts carried by the dome 8a. There are four such contacts shown. The contact 48 is connected to the other terminal of the coil of inlet valve 42. The contact 49 is connected to the other teminal of the coil of the exhaust valve 45. The contact 50 is connected to the other terminals of the coils of the inlet valve 41 and the exhaust valve 43. The contact 51 is connected to the other terminal of the coils of both the inlet valve 40 and the exhaust valve 44. The contacts 48 and 49 are positioned in spaced relation one above the other, while the contacts 50 and 51 are laterally spaced apart and are of arcuate form, the center of which is the axis of a pivot 52 on which a weighted pendulum switch 53 is fulcrumed. This switch member carries a movable contact 54. Contacts 49, 50 and 51 are mounted on an insulating plate 51a supported by the frame.

The operation of the structure of Fig. 11 is as follows:

If the chassis is overloaded with respect to the pressure of the air in the load carrying compressed air chamber 23a, the contact 48 will be depressed to engage the contact 48 with contact 54 of the pendulum which is grounded at 55. This will complete a circuit through the solenoid of the inlet valve 42 and compressed air will be admitted into the load carrying chamber 23 until proper pressure is provided therein to sustain the load. When this has been accomplished, the contact 48 will be disengaged from the contact 54 and the inlet valve 42 will automatically close.

In the event that the pressure in the load carrying chamber 23 is too great, the contact 49 will rise and engage the contact 54, causing a circuit to be completed through the coil of the exhaust valve 45, with the result that said valve will be open to vent the chamber until the proper pressure is restored.

When the vehicle is on a transversely inclined road, which would tend to tilt the chassis frame and body thereon to the right in Fig. 11, then the switch pendulum 53 will oscillate counterclockwise to engage its contact 54 with the contact 50. As a result a circuit will be completed through the coil of vent valve 43 to vent the interior of the cushion 26a and at the same time the valve 41 will be opened to increase the pressure in the cushion 26b.

Directly below the cushions 26 are bearing plates 56 and 57 rigid with the axle and against these plates the cushions 26a and 26b at all times engage. Consequently when the pressures in these two cushions are inversely changed as described, the resulting differential pressures will exert a righting action on the vehicle body and function to maintain it in upright position or at least materially minimize the tilt. Thus, as the switch pendulum 53 swings from one side to the other in accordance with the lateral inclination of the road, the body will be automatically retained in upright position and the tendency of said body to seriously laterally tilt or lean will be positively overcome.

The vehicle of the foregoing description is provided with pneumatic suspensions for both the front and rear wheels. The pneumatic chambers within the domes act through the flexible diaphragms 14 and 22 to support the vehicle on compressed air contained within said chambers. Said compressed air may be supplied from an appropriate tank and/or air compressor on the vehicle and may be regulated by any means well known to the art in accordance with the load to be carried.

The foregoing detailed description sets forth the invention in its preferred practical forms, but the invention is to be understood as fully commensurate with the appended claims.

Having thus fully described the invention, what I claim as new and desire to secure by Letters Patent is:

1. A motor vehicle chassis comprising: a pressed sheet metal chassis frame within the body of which is formed an integral upwardly projecting dome having an open bottom, a flexible diaphragm covering the bottom open side of said dome to form within the dome a compressed air chamber, an arm one end of which is pivotally mounted on the frame, means for securing the other end of the arm to the diaphragm, and a wheel connected to said arm.

2. A motor vehicle chassis according to claim 1, wherein the parts referred to in said claim are duplicated at opposite sides of the vehicle to form an independent suspension associated with one wheel at each side of the vehicle.

3. A chassis frame for motor vehicles comprising: a stamped sheet metal chassis frame integral throughout the entire width of the frame and provided in the rear portion with a dome pressed upwardly in the stamping and extending for the greater portion of the width of the frame, a diaphragm extending across the open bottom of the dome, a rear axle, and means for securing the rear axle to the diaphragm, the interior of said dome constituting a chamber to receive compressed air under sufficient pressure to support the rear portion of the chassis frame and the weight of the body and load imposed thereon.

4. A motor vehicle chassis comprising: a frame, the forward portion of which comprises a horizontal sheet metal stamping, the transverse medial portion of which is provided with an engine opening and the lateral portions of which are provided with upwardly projecting integral domes, a diaphragm across the open bottom of each dome to form therein a compressed air chamber, a fulcrum shaft extending transversely across the forward portion of the frame and supported thereon, an arm pivotally supported on the fulcrum shaft adjacent each of the lateral sides of the frame and extending rearwardly and each arm supporting a wheel, and means for securing each arm to substantially the central portion of the corresponding diaphragm.

5. A motor vehicle comprising a chassis frame provided with a load carrying compressed air chamber having a diaphragm at its bottom, an axle secured to said diaphragm, pneumatic cushions positioned within the load carrying chamber on opposite sides of the longitudinal vertical medial plane of the chassis frame and confined between upper and lower horizontal walls of said chamber, electrically controlled means for supplying compressed air to the pneumatic cushions and for venting said cushions, and electric circuits including a pendulum switch fulcrumed on an axis extending longitudinally of the chassis frame and acting on said electrically controlled means to admit compressed air into and vent said pneumatic cushions selectively.

6. A motor vehicle according to claim 5, wherein the electrically controlled means comprises solenoid valves the coils of which are included in said electric circuits.

7. A motor vehicle according to claim 5, comprising additional means controlled by the pendulum switch for admitting compressed air into and venting the load carrying chamber in accordance with loading of the vehicle.

8. A motor vehicle comprising a chassis frame provided with a load carrying compressed air chamber having a diaphragm at its bottom, an axle secured to said diaphragm, pneumatic cushions positioned within the load carrying chamber on opposite sides of the longitudinal vertical medial plane of the chassis frame and confined between upper and lower horizontal walls of said chamber, a source of compressed air, air supply tubes connecting said source to each of the pneumatic cushions and to the load carrying chamber, vent tubes leading from each of said cushions and from said chamber to the atmosphere, a solenoid controlled valve in each tube, a pendulum switch comprising a pivoted pendulum carrying a movable contact to selectively engage with fixed contacts carried by the frame in normally spaced relation to and above and below said movable contact and with fixed contacts carried by said frame and normally spaced laterally of the movable contact, and electrical circuits including the several solenoid valves and the corresponding fixed contacts and the pendulum of the pendulum switch to selectively admit compressed air into the cushions and load carrying chamber and to vent the same in accordance with the operations of the pendulum and the loading of the vehicle.

9. A chassis frame for motor vehicles comprising: a sheet metal stamping extending for the full length and width of the frame and provided with a pressed up dome having an open bottom, a flexible diaphragm across said open bottom to form within the dome a compressed air chamber for a pneumatic suspension.

10. A chassis frame as in claim 9, wherein said dome is transversely centrally of the frame.

11. A chassis frame as in claim 9, wherein two such domes are positioned in the forward portion of the frame.

12. A motor vehicle chassis comprising: a stamped metal frame provided with an upwardly domed portion, a flexible diaphragm across the open bottom of said dome to form within the dome a compressed air chamber, and a wheel carrying axle connected to said diaphragm in spaced relation to the outer periphery of the diaphragm, in combination with a bumper having an air chamber with a flexible wall, and a duct connecting the interior of the air chamber of the bumper with the compressed air chamber within the dome.

13. A motor vehicle chassis comprising: a pressed sheet metal chassis frame within the body of which is formed an integral upwardly projecting dome, a flexible diaphragm covering the bottom open side of said dome to form within the dome a compressed air chamber, an arm one end of which is pivotally mounted on the frame, means for securing the other end of the arm to the central portion of the diaphragm, and a wheel connected to said arm, in combination with a bumper including a pneumatic chamber with means for connecting the interior of said pneumatic chamber with the air chamber within the dome.

14. A motor vehicle chassis comprising: a frame, the forward portion of which comprises a horizontal sheet metal stamping, the transverse medial portion of which is provided with an engine opening and the lateral portions of which are provided with upwardly projecting integral domes, a diaphragm across the open bottom of each dome to form therein a compressed air chamber, a fulcrum shaft extending transversely across the forward portion of the frame and supported thereon, an arm pivotally supported on the fulcrum shaft adjacent each of the lateral sides of the frame and extending rearwardly and each arm supporting a wheel, and means for securing each arm to substantially the central portion of the corresponding diaphragm, in combination with a pneumatic bumper extending transversely across the front of the frame and having a flexible wall enclosing a pneumatic chamber, and ducts connecting said pneumatic chamber to the interiors of both of the domes.

References Cited in the file of this patent

UNITED STATES PATENTS

| | | |
|---|---|---|
| 850,180 | Podstata | Apr. 16, 1907 |
| 1,290,958 | Foster | Jan. 14, 1919 |
| 1,672,179 | Short | June 5, 1928 |
| 2,002,474 | Johnston | May 21, 1935 |
| 2,074,158 | Avery | Mar. 16, 1937 |
| 2,292,646 | McIntosh | Aug. 11, 1942 |
| 2,663,569 | Gouirand | Dec. 22, 1953 |